United States Patent [19]

Nolte

[11] Patent Number: 4,506,734

[45] Date of Patent: Mar. 26, 1985

[54] FRACTURING FLUID BREAKER SYSTEM WHICH IS ACTIVATED BY FRACTURE CLOSURE

[75] Inventor: Kenneth G. Nolte, Tulsa, Okla.

[73] Assignee: The Standard Oil Company, Chicago, Ill.

[21] Appl. No.: 530,174

[22] Filed: Sep. 7, 1983

[51] Int. Cl.$^3$ ............................................. E21B 43/26
[52] U.S. Cl. ..................................... 166/308; 166/300
[58] Field of Search ........................ 166/300, 308, 249

[56] References Cited

U.S. PATENT DOCUMENTS

| | | |
|---|---|---|
| 3,030,215 | 4/1962 | Veatch et al. |
| 3,365,315 | 1/1968 | Beck et al. |
| 3,990,512 | 11/1976 | Kuris ................................... 166/249 |
| 4,202,795 | 5/1980 | Burnham et al. .................. 252/332 |

Primary Examiner—Stephen J. Novosad
Assistant Examiner—William P. Neuder
Attorney, Agent, or Firm—Scott H. Brown; Fred E. Hook

[57] ABSTRACT

Disclosed are compositions and related methods of use for reducing the viscosity of a fluid introduced into a subterranean formation. The compositions are introduced into the subterranean formation and are nonreactive to the fluid until activated by the closing of any fractures in the subterranean formation upon the compositions. The compositions are comprised of a viscosity reducing chemical, such as an enzyme, oxidizing agent, acid, catalyst, or mixtures thereof, encapsulated in dry or liquid form within hollow or porous, crushable beads. The beads can be formed from glass, ceramics, plastics, gels, or mixtures thereof.

6 Claims, No Drawings

FRACTURING FLUID BREAKER SYSTEM WHICH IS ACTIVATED BY FRACTURE CLOSURE

BACKGROUND OF THE INVENTION

1. Field of the Invention

The present invention relates to methods and compositions for initiating the reduction of the viscosity of fracturing fluids introduced into a subterranean formation and, more particularly, to such methods and compositions which are designed so that the reduction of the viscosity is initiated by closure of fractures in the subterreanean formation.

2. Setting of the Invention

Hydraulic fracturing treatments and fracture-acidizing treatments are commonly utilized to increase the permeability of a subterreanean formation for greater hydrocarbon flow from the formation to a wellbore. In such treatments, fracturing fluids are introduced into the subterranean formation under sufficient pressure to create cracks or fractures in the formation and to also propagate these fractures out into the formation. Generally, the fracturing fluids contain entrained proppants, such as sand or sintered bauxite, so that as the fracturing fluid seeps into the formation or is backflowed out from the fractures, the fractures close upon the proppants to maintain the fractures in an open state for increased permeability.

In utilizing certain fracturing fluids, such as high viscosity aqueous gels, water-hydrocarbon emulsions, or oil-based fluids, it is preferred to maintain the viscosity of these fracturing fluids while the fractures are being created and propagated, as well as to aid in transporting the proppants to the farthest reaches of the fractures. Ideally the viscosity of the fracturing fluids is maintained until the time at which the fractures close upon and trap the proppants, but before the proppants settle to the bottom of the fractures. After the proppants have been trapped in the fractures, it is desirable that the viscosity of the fluids be quickly reduced to allow the fluids to flow back through the fractures, around the proppants and back into the wellbore. The ultimate success of the treatment depends partly on the proper and quick removal of the fracturing fluids. Chemicals utilized to reduce the viscosity of fracturing fluids are commonly called "breakers" or "breaker fluids" and are introduced into the fractures to act immediately upon the fracturing fluids upon contact with the fluids or upon reaching a predetermined temperature. Breakers commonly used include oxidizing agents, enzymes, acids, catalysts of iron, copper and silver, and mixtures thereof. Specific examples of breakers include sodium persulfate and ammonium persulfate, alpha and beta amylases, amyloglucosidase, aligoglucosidase, invertase, maltase, cellulase, hemicellulase, fumaric acid, nitric acid, and the like. These breaker chemicals can be in the form of either a liquid or a powder which is activated by contact with oil or water. Premature chemical reaction of the breaker with the fracturing fluids can significantly degrade the fracturing fluids, i.e., reduce their viscosity before the proper termination of a treatment, which can significantly reduce the overall effectiveness of the treatment.

Various methods have been proposed to delay the viscosity-reducing action of the breakers by forming the breaker into pellets and then coating the breaker pellets. One such method is disclosed in U.S. Pat. No. 4,202,795 to Burnham, et al. In Burnham, pellets of a breaker fluid material are encapsulated within a gel coating, and included in the pellets is a gel-degrading substance. The pellets have a predetermined time delay after which the gel dissolving chemical will dissolve the protective gel coating to release the breaker chemical into the fracturing fluid to reduce its viscosity. A serious problem encountered when using this type of breaker system is that these systems tend to release their active ingredients over a significant period of time due to differences in the thickness of the protective coating and the length of time and temperature exposure of individual pellets introduced into the fluid system. Also, the hydraulic fracturing treatment can take much longer than anticipated, and the viscosity of the fracturing fluid is then reduced before the proppants are trapped in the furthest reaches of the fractures. If the hydraulic fracturing treatment takes a shorter period of time than anticipated, the operators must wait for the fracturing fluid's viscosity to be reduced so the treatment can be finished.

Another serious problem is in estimating the time after fluid introduction has stopped when the fracture will close and trap the proppants. This time interval can be from only a few minutes for high permeability formations or up to over 24 hours for very low permeability formations. If the proppants are not suspended in the farthest reaches of the fractures as the fracture closes, then the greatest effectiveness of the fracturing treatment generally has not been obtained; therefore, the greatest productivity of the well cannot be obtained. Also, if the operator needs to wait for the breaker fluid to reduce the viscosity of the fracturing fluid even after the fracture has closed upon the proppants, then this waiting or downtime can add substantial additional costs to the treatment.

There is a need for a method of using a breaker where the breaker is inert to the hydraulic fracturing fluid until activated by the closing of the fracture upon the proppants. In addition, there is a need for a method which uses much larger concentrations of breaker fluid than what can be normally utilized using the mentioned systems. This increased concentration of breaker fluid will not only permit the desired viscosity reduction to occur, but also greatly aid in the removal of organic residue of the viscosity and/or fluid loss agents generally used in the fracture fluids. The reduction of the residue can result in higher permeability for flow through the trapped proppants and hence result in a more effective fracture treatment.

SUMMARY OF THE INVENTION

The present invention provides a method for reducing the viscosity and resulting residue of an aqueous or oil based fluid introduced into a subterranean formation. Specifically, the method includes introducing a viscosity reducing chemical contained within hollow or porous, crushable and fragile beads along with a fluid, such as a hydraulic fracturing fluid, under pressure into the subterranean formation. When the fracturing fluid passes or leaks off into the formation or the fluid is removed by back flowing, any resulting fractures in the subterranean formation close and crush the beads. The crushing of the beads then releases the viscosity reducing chemical into the fluid at the most appropriate time. The hollow or porous fragile beads can be formed from glass, highly porous ceramics, plastic, gels and mixtures thereof and can contain solid or liquid viscosity reducing chemicals, such as enzymes, oxidizing agents, acids, catalysts and mixtures thereof. The method of the present invention provides for the release of chemicals at the ideal time and is not dependent upon the potentially erroneous estimates of time and temperature as required by earlier methods.

DETAILED DESCRIPTION OF THE PREFERRED EMBODIMENTS

The present invention provides compositions and related methods of use for reducing the viscosity of a fluid introduced into a subterranean formation and reducing any resulting residue by introducing a viscosity reducing chemical under pressure into the formation, contained within hollow or porous, crushable beads along with a fluid, such as a hydraulic fracturing fluid. When the introduction pressure of the chemical and fluid is reduced due to the fluid leaking off or passing into the formation or due to the removal of the fluid by back flowing through the wellbore, any fractures in the formation close upon and crush the beads. The crushing of the beads then releases the viscosity reducing chemical into the fluid for initiation of the viscosity reduction. The compositions disclosed herein can be utilized in hydraulic fracturing treatments, as well as hydraulic fracture-acidizing treatments and any other operation for the delayed release of chemicals and fluids as apparent to those skilled in the art.

The viscosity reducing chemical mentioned above is commonly referred to as a breaker and can be in the form of a dry powder, which is activated upon contact with a fluid, emulsion, or liquid state. The breaker itself can be an enzyme, oxidizer, a catalyst of silver, iron, or copper, as well as certain types of acids, including fumaric and nitric acid, or a mixture of these. The hollow or porous, crushable beads which encapsulate and contain the viscosity reducing chemical can be formed from glass, highly porous ceramics, plastics, gels, and mixtures thereof. The term glass as used herein can include spheres made of ceramic material, float ash, fly ash, etc. The breaker chemical can be encapsulated in the hollow or porous spheres in any commercially utilized method, as apparent to those skilled in the art. One such method of making hollow or porous spheres is disclosed in U.S. Pat. Nos. 3,365,315 to Beck, et al., and 3,030,215 to Veatch, et al., wherein hollow or porous microspheres are produced. The microspheres contain a gas, but can easily contain a chemical fluid, emulsion or powder. Such microspheres with encapsulated chemicals are presently available as carbon-less carbon paper and produced by Kimberly Clark Paper Company.

The crushable beads containing the viscosity reducing chemical preferably having sufficient ductility to prevent their breakage when (a) passing through surface pumps and blending equipment commonly utilized in hydraulic fracturing treatments and (b) being introduced into the wellbore and out into the formation. Also, the beads preferably are capable of withstanding the hydrostatic pressure within the formation without significant or any breakage. Such hydrostatic pressures encountered can be from about 1000 psi upwards to above about 10,000 psi. Also, a small hole can be provided in each of the beads to permit some fluid entry into each bead to equalize the pressures within and without. The hole size is preferably small enough to prevent any significant leakage of the breaker chemical from having a deleterious effect on the overall fracture treatment.

The beads are designed so that when surrounded by hydrostatic fluid pressure (equal on all sides) they will not break; however, when the hydrostatic pressure is released and the beads come into contact with the proppants or the fracture formation face, where there is unequal pressure on all sides, the beads will break. The beads can be formed in either round, square, or irregular configurations; however, it is preferred that the beads be of an irregular shape to aid their breakage by contact with the proppant particles upon closure of the fracture. The beads' size can be from about 0.75 to about 3 times the size of the proppant. However, it is preferred that the bead size be at least greater than the proppant size to aid breakage when the fractures close upon the proppants and the beads. Based on the size of commonly used proppants, sizes for the beads can be in the range from about 200 to about 3 ASTM mesh size.

The viscosity reducing chemical can be introduced with the proppants into the fracturing fluid in the quantity of from about 0.01 weight percent to about 0.85 weight percent by weight of the fracturing fluid, and with a proppant concentration of from about 1 to about 20 lbs per gallon.

In one embodiment of the present invention, the beads of a selected size and containing a selected chemical are mixed with the proppant and are introduced into surface mixers for combination with the hydraulic fracturing or fracture-acidizing fluids. The fluids, proppant and beads are then introduced into the formation under sufficient pressure to cause fractures in the formation. Once the fractures have extended to their furthest limits and the proppant has been carried to the furthest reaches of the fractures, then the fluid is backflowed or allowed to leak off into the fraction to permit the fractures to close upon the proppants and the beads. As the proppants come into contact with the beads upon closure of the fractures and the hydrostatic equilibrium is reduced by the leak off of the fluids or the back flowing of the fluids from the fractures, the beads are crushed by the closing fractures and thereby release the viscosity reducing chemical. The viscosity reducing chemical then acts upon the hydraulic fracturing fluid reducing its viscosity and also reduces any residue of the "broken" fluids so that the fluids will flow back out of the fractures around the proppants and the formation fluids will pass through the fracture to the wellbore for production.

The present invention can also be used to place other chemicals into the formation fractures alone or along with the breaker fluids. Such chemicals can include nonemulsifying agents and scale inhibitors which have an affinity for the formation rocks. Also, breaker chemicals can be used by way of this invention to remove filter cake on the formation face or to remove organic fluid loss additives at the end of a treatment.

Whereas the present invention has been described in particular relation to concepts disclosed herein, it should be understood that other and further modifications, apart from those shown or suggested herein, may be made within the scope and spirit of this invention.

What is claimed is:

1. A method for reducing the viscosity of a fluid introduced into a subterranean formation, comprising:
   introducing under pressure a viscosity reducing chemical, contained within hollow or porous, crushable beads, and the fluid into said formation, and reducing said introduction pressure so any resulting fractures in said formation close and crush said beads, whereby the crushing of said beads releases said viscosity reducing chemical.

2. The method of claim 1 wherein said fluid is a hydraulic fracturing fluid and said viscosity reducing chemical is a breaker fluid utilized for reducing the viscosity of said hydraulic fracturing fluid.

3. The method of claim 1 wherein said fluid includes entrained proppants within a concentration of from about 1 to about 20 ppg.

4. The method of claim 1 wherein said viscosity reducing chemical is present with said fluid in an amount of from about 0.01 weight percent to about 0.85 weight percent by weight of said fluid.

5. The method of claim 1 wherein said viscosity reducing chemical is selected from enzymes, oxidized agents, acids, catalysts, and mixtures thereof.

6. The method of claim 1 wherein said beads are formed of materials selected from glass, ceramics, plastics, gels, and mixtures thereof.

* * * * *